Figure 1:
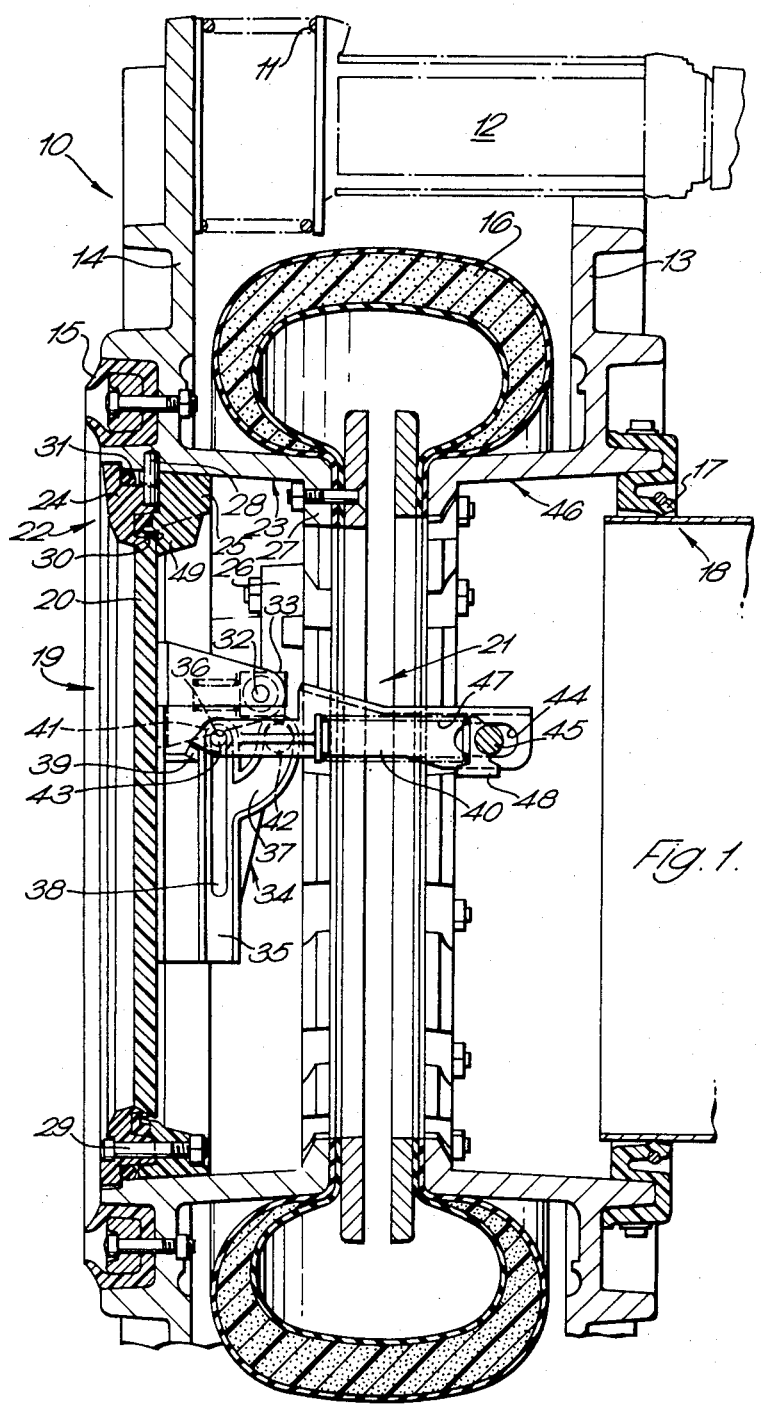

United States Patent [19]
Pearson

[11] 3,713,623
[45] Jan. 30, 1973

[54] EXTENSIBLE COUPLING HAVING AUTOMATIC VALVE MEANS

[75] Inventor: Kenneth White Pearson, Somerset, England

[73] Assignee: Shipowners Refrigerated Cargo Research Association, London, England

[22] Filed: March 22, 1971

[21] Appl. No.: 126,618

[30] Foreign Application Priority Data

April 19, 1971 Great Britain.....................13,612/70

[52] U.S. Cl..................251/150, 251/149.2, 285/9 R
[51] Int. Cl...............................................F16l 29/00
[58] Field of Search..................251/150, 149.2, 147; 137/614.05, 614.06; 285/9, 298, 299

[56] References Cited

UNITED STATES PATENTS

| | | | |
|---|---|---|---|
| 798,321 | 8/1905 | Carter | 251/149.2 |
| 3,463,516 | 8/1969 | Munton | 285/9 R |
| 3,473,828 | 10/1969 | Pearson | 285/9 R |
| 3,606,389 | 9/1971 | Munton et al. | 285/9 R |

*Primary Examiner*—William R. Cline
*Attorney*—Donald M. Wight et al.

[57] ABSTRACT

A coupling designed particularly for connecting an aperture in a wall of a refrigerated transportable container with a supply of conditioning air is provided with a valve member wholly enclosed within the coupling and arranged automatically to open when the coupling is moved to an extended operative position and automatically to move to a closed position when the coupling is moved to a withdrawn inoperative position. The coupling includes an extenable hollow body or duct having connecting means at one end adapted to be connected around the first aperture leading to the supply of conditioning air and sealing means at the other end of the body adapted to be sealed in abutting relationship with a flat sealing surface surrounding the aperture in the container wall so as to provide a fluid passage from the first aperture to the second aperture. Power means are associated with the coupling to move it between its extended operative position and its retracted inoperative position. It is desirable, but not essential, that the coupling, when in its extended operative position, can accommodate limited movement of the container wall aperture with respect to the first aperture leading to the conditioning air, in every plane.

31 Claims, 4 Drawing Figures

Inventor:
Kenneth White Pearson
BY Baldwin Wight & Brown
Attorneys

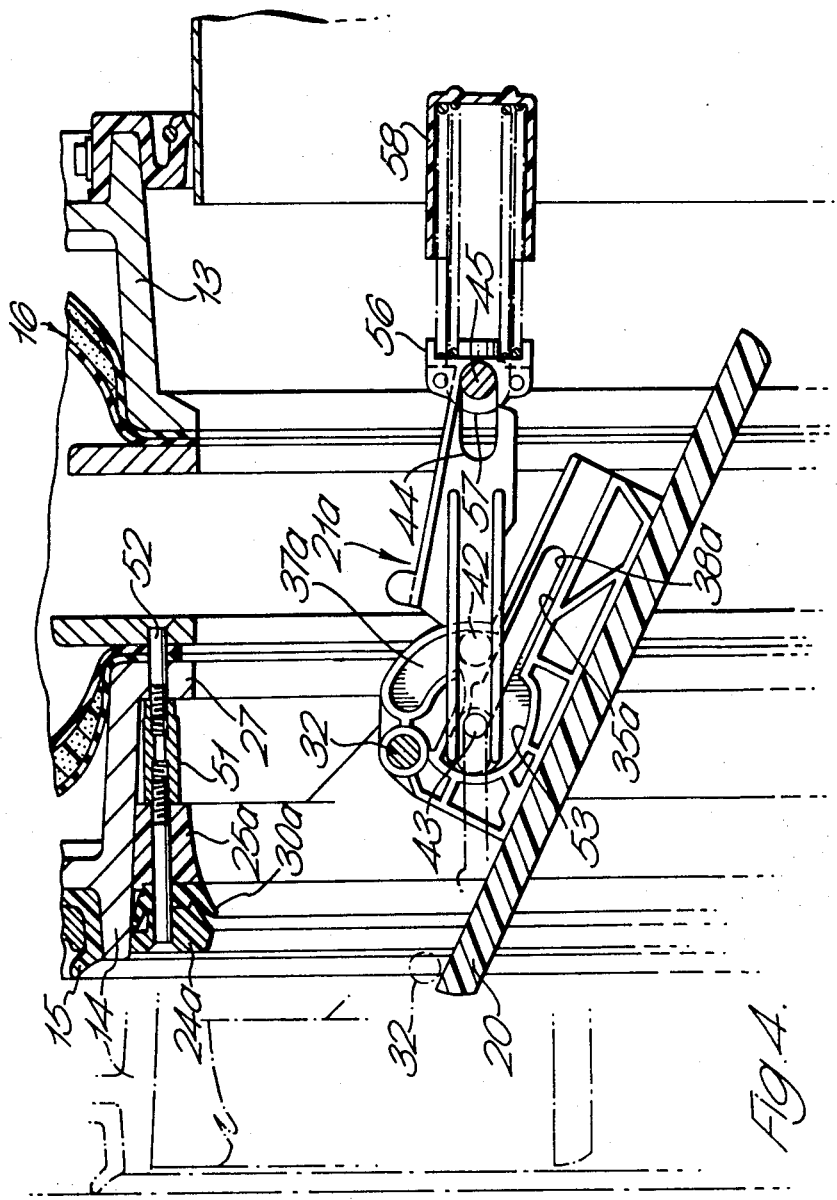

EXTENSIBLE COUPLING HAVING AUTOMATIC VALVE MEANS

This invention relates to an extensible connector or coupling provided with an automatically operated valve substantially contained within the movable portion of an extensible connector or coupling.

Such connectors are used for coupling the interior of a refrigerated transportable container with a supply of fluid for heat transfer purposes, e.g., refrigeration. An example of one such connector is disclosed in U.S. Pat. Nos. 3,463,516 and 3,473,828.

Refrigerated cargo containers are usually transported and stored, in ships or on shore, in vertical stacks positioned within upright guides which of necessity have clearance laterally and longitudinally in relation to the container. In consequence, the container position can vary initially in relation to the guides and subsequently further displacement can take place particularly during transit.

Connectors for such use must be retracted to a clearance position free of the containers prior to loading or unloading.

When the containers have been stacked, the connector is extended to contact the container, around an aperture in the container wall, and, the position of the container can vary due to clearance in the guides. Thus the connector must move initially to abut and seal with a container in contact with the adjacent guides and must also be capable of further extension in the event of the container moving away from the guides. The variation in this position is limited to the clearance between the container and the guides. Admission of atmosphere to the heat transfer circuit is detrimental since it rapidly causes formation of ice within the system and allows the ingress of airborne contaminants.

The present invention seeks to provide an automatic valve contained within the connector which prevents ingress of atmosphere or escape of heat transfer fluid when the connector is in its retracted position, and which opens fully during the initial extension of the connector and remains locked substantially in that position throughout the further extension.

The invention also seeks to provide a valve which, when closed, presents a substantially flush external face adjacent to the outer or extending end of the connector so that lodgement of contaminants is minimized and yet which when open, does not protrude beyond the sealing face of the outer or extending end.

According to the present invention, we provide a valved coupling suitable for connecting an aperture leading to the interior of a refrigerated transportable container with a supply of fluid, the coupling comprising an extendible hollow body, connecting means at one end of the body adapted to be connected around a first aperture leading to the supply of fluid and abutment sealing means at the other end of the body adapted to be sealed in abutting relationship with a flat sealing surface surrounding a second aperture so as to provide a fluid passage from the first aperture to the second aperture, and a valve associated with the coupling and arranged to permit fluid to pass through the passage when the coupling is sealed in abutting relationship with said flat sealing surface around the second aperture and to close off said passage to prevent fluid passing through the passage when the coupling is in a withdrawn, inoperative position. The coupling, when extended so that said abutment sealing means is in engagement with said sealing surface, accommodating limited movement of the second aperture with respect to said first aperture, in every plane, Hence, when the value is closed and the coupling is in its retracted position ingress of atmosphere or escape of fluid is impossible.

Preferably, the coupling is moved to its operative, abutting relationship with the sealing surface by spring means and to its inoperative position by power means, such as a pneumatic or hydraulic motor, acting against the spring means.

Preferably, the valve opens automatically when the coupling is moved to its extended operative position, and vice versa.

Preferably, the valve includes a valve disc within the coupling body, the periphery of the valve disc being arranged to form a seal with a valve seat provided on the internal periphery of an aperture in a sealing plate carrying the abutment sealing means, and the valve disc is pivotally mounted for rotation about an axis fixed relative the sealing plate. Opening and closing of the valve disc may be effected by a track and linkage arrangement. In one construction, the track and linkage arrangement is supplemented by limited freedom of the valve pivot causing pivotal movement of the valve disc and longitudinal movement. Alternatively, however, the valve disc may open and close only with a pivoting movement.

Preferably, the track is associated with the disc and the linkage is associated with a fixed part of the coupling.

In a particular construction, a slot may be provided in a member forming a slider track projecting from the rear of the valve disc, the slot and a straight portion of the track being parallel to said rear face, and a projection is mounted on one end of a connecting link, the other end of which is pivotally mounted on a fixed part of the coupling. The straight portion of the track merges with an arcuate portion and the track is engaged by a pair of projections mounted on the link adjacent a forward end, the arcuate portion of the track being effective to guide the disc valve during its pivotal movement between its open and closed positions.

Preferably, the slot and track are offset with respect to the pivot for the valve disc so that extension of the coupling body will cause a couple to be applied to the valve disc about its pivot by means of the projections acting on the curved portion of the track. In the preferred arrangement, pivoting of the valve disc between open and closed positions occurs during initial coupling extension and final coupling retraction, and the projections adjacent the end of the link, during pivotal movement of the disc valve, move along the arcuate portion of the track, and when the disc is in an open position, they are guided along the straight line portion of the track during further movement of the coupling, thereby acting with a rod in the slot, to hold the disc fully open.

The pivot for the disc may be supported in a slidable trunnion block carried by the disc and biased away from the valve seat to enable relative movement between the valve disc and its valve seat to unseat the valve disc, and vice versa.

Preferably, at the rear end of the connecting link a lost motion device is provided where the link is pivotally mounted on a fixed part of the coupling to enable limited relative sliding movement of the link on its pivot, to enable the coupling to be latched and unlatched when in its retracted position.

Preferably, biassing means are provided to bias the valve disc to a closed position when the coupling is fully retracted, the biasing means are preferably associated with the lost motion device so that, at all times when the valve is closed, at least one of the links is biased towards the disc. Preferably, the outer surface of the disc when in a closed position is substantially flush with the o outermost surfaces of the abutment sealing means.

Preferably, the disc and its operating mechanism is housed wholly within the coupling, and when the valve is opened, it pivots inwardly, away from the second aperture, and remains wholly within the coupling when open.

When the disc is closed, there may be a tendency for the pin to move along the slot due to vibration forces. Suitable interlocking means, including a stop may therefore be provided to prevent this occuring.

In an alternative embodiment, a stop is not necessary and the tracks and projections engaging with the tracks are dimensioned to prevent any tendency of pin movement. Furthermore, they also permit limited movement of the sealing plate and disc relative to the connecting link, without releasing the spring bias on the disc. This movement, together with the limited sliding movement of the connecting links on their pivot enables the sealing plate and valve disc to have limited movement relative to the fixed part of the coupling without causing damage to the slider track or other operating parts.

Figure 2:
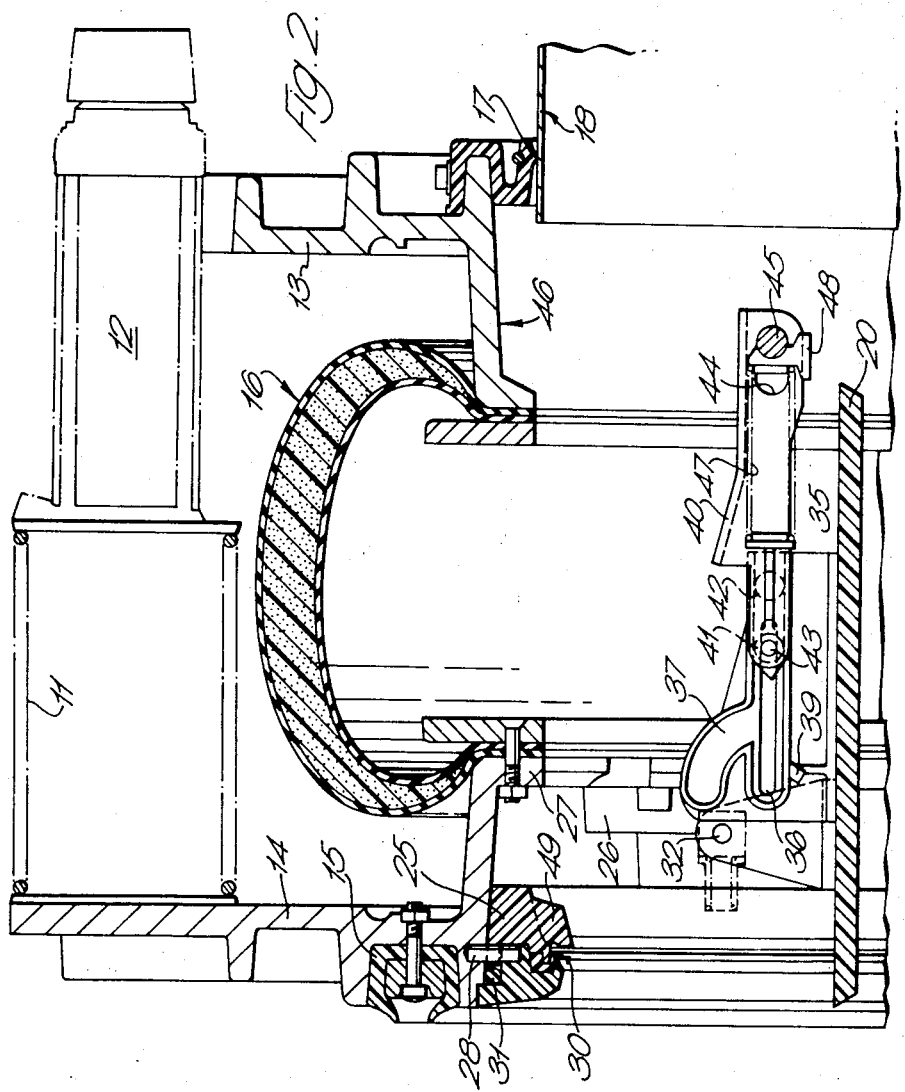
Figure 3:
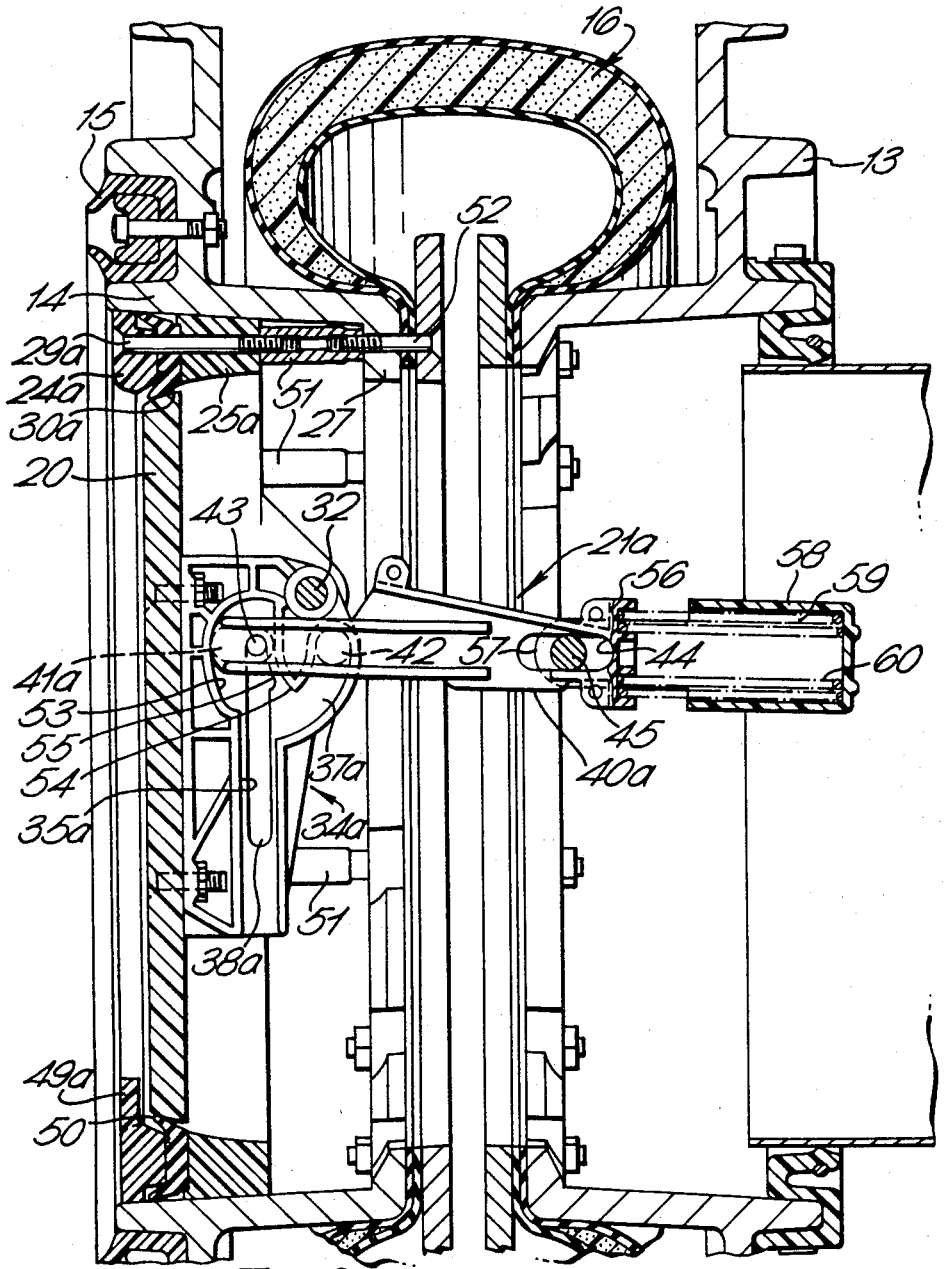

Two embodiments of the invention are now described, with reference to the accompanying drawings, in which:

FIG. 1 shows a horizontal section of a connector in a retracted position with a valve closed, FIG. 2 shows a horizontal half section of the connector in a fully extended position with the valve open, FIG. 3 is a view similar to FIG. 1, of a modified and preferred embodiment, and FIG. 4 is a partly schematic section, showing the valve between open and closed positions.

Referring particularly to FIGS. 1 and 2 of the drawings, the connector shown generally at 10 is held in a retracted position against the force of springs 11 by mechanical latch means (not shown) contained within pneumatic retracting piston and cylinder assemblies 12. The assemblies 12 are pivotally attached to a mounting plate 13 and carry a sealing plate 14 by means of articulated ball joints (not shown). An annular face seal 15 is carried on the sealing plate 14 and effects a seal when in abutment with a container (not shown). An annular flexible coupling body 16 having an internal insulating layer between two membranes is attached to the plates 13 and 14 and allows axial extension and lateral displacement and articulation of the sealing plate 14 relative to the fixed mounting plate 13. A fixed seal 17 forms a fluid tight joint with a duct 18 conveying heat transfer fluid, and for example leading to a refrigeration source.

In accordance with this invention, the connector is provided with a valve shown generally at 19 and comprising a pivotally mounted disc 20 actuated by operating means shown generally at 21, the disc 20 co-operating with the valve seat shown generally at 22 located within a bore 23 formed in the sealing plate 14.

The valve seat 22 comprises two mating annular rings 24 and 25, the inner ring 25 being located within the bore 23 by suitable means, for example, spacing pillars 26 secured to an inwardly formed flange 27 located at the inner end of the bore 23. Alternatively or additively the ring 25 (and the ring 24) can be secured in the bore 23 by a plurality of radially extending pins 28 inserted into the sealing plate 14 and contained within grooves formed in either or both the rings 24 and 25.

The rings 24 and 25 are held together by fixing studs 29 and form a retaining groove for a resilient seal 30 arranged to co-operate with the valve disc 20. A static seal 31 forms a fluid tight joint between the outer ring 24 and the bore 23.

A pivot 32 for the valve disc 20 is positioned appreciably inboard of the disc and is also off-set from the axis of the valve by a similar amount. The pivot bearings, as shown, but not essentially, are carried in trunnion blocks 33 slidably mounted for limited axial movement in a housing formed within the spacing pillars 26, Alternatively the pivot 32 is housed in elongated holes formed in projections or support arms attached to the inner ring 25, as shown in the FIG. 3 embodiment. As shown in FIG. 1, the trunnion blocks 33 are lightly spring biased in a direction away from the resilient seal 30. The valve disc 20 is supported on the pivot 32 by support arms 3 extending from the disc.

A double sided slider track shown generally at 34 is attached to the inner face of the disc valve 20, and comprises a double sided straight portion 35 which lies parallel to the plane of the disc and is terminated at a point 36 which lies on a line passing through the axis of pivot 32 and is inclined towards the center of the disc at an angle of substantially 45° to the plane of the disc 20. Leading from the straight portion 35 of the slider track 34 is a curved, double sided branch portion 37, the center of curvature of which is the point 36. A slot 38 terminating at the point 36 and having a length in excess of the total connector extension is formed through the center of the straight portion 35. In proximity to the point 36, adjacent to the side of the straight portion of the slider track nearest the disc, is at least one protruding stop member 39.

The valve operating means shown generally at 21 comprises a connecting link 40 of substantially U shaped cross section which at its end adjacent to the valve disc is divided into two arms which pass one to either side of the slider track 34. The extreme ends of the arms are arranged to engage the respective stop member 39. The inner face of each arm carries a pair of spaced circular projections 41,42. Projections 41 at the end of the arms co-operate with the straight portions 35 of the slider tracks 34, and projections 42 co-operate both with the curved branch portions 37 of the slider track and part of the straight portions. A bar or pin 43 passes through the common centers of the projections 41 and through the slot 38 and is secured to each arm of the connecting link 40.

The end of the connecting link 40 adjacent to the duct 18 is provided with a pair of elongated holes 44 through which passes a transverse shaft 45, which is secured within a bore 46 of the mounting plate 13. Compression springs 47 mounted at each side of the connecting link 40 bear upon a locating saddle 48 contacting the transverse shaft 45. Suitable pads are formed integrally with the connecting links 40 to locate the spring ends remote from the shaft 45 and a stiffening rib extends from the back of each pad along the outside of each arm, towards the bar 43.

In an alternative construction, the connecting link 40 is duplicated and suitable double sided slider tracks are formed integrally with the support arms 3 connecting the disc valve 20 and pivots 32. This arrangement reduces the bending forces applied to the shaft 45 or can obviate the need for the transverse shaft 45 as each connecting link 40 can be individually attached in a suitable manner to its adjacent wall of the bore 46.

The operation of the automatic valve means will now be described in relation to a connector in its retracted position. In order to disengage the mechanical latches contained within the pneumatic cylinders 12, a small additional retracting movement is required. This movement is accommodated by relative motion between the elongated holes 44 within the connecting link 40 and transverse shaft 45 against the spring loaded locating saddle 48. As the sealing plate 14 moves away from the static mounting plate 13 due to the action of the springs 11, the transverse shaft 45 contacts the end of elongated holes 44 and a tension is applied to the connecting link 40. This tension acts through projections 42 and the edge of curved track 37 and applies a positive unseating force to the disc valve 20 causing it to displace axially from the seat 22.

This axial displacement is arrested as soon as the trunnion blocks 33 contact the ends of their respective housings and further extension of the connector causes a couple to be applied to the disc valve about its pivot 32 by virtue of the projections 42 contacting curved surfaces of track portion 37 remote from point 36. Under the continued action of the couple, the valve disc rotates through substantially 90° at which instant, the projections 42 disengages from the curved branch portions 37 of the slider tracks to engage the straight portions 35.

If will be appreciated that once the projections 42 have entered the straight portions 35 of the slider tracks the projections 41 and 42 co-operate to prevent any angular movement between the valve disc 20 and connecting link 40, and thus the valve is held positively in the fully open position. The mechanical sequence so far described all takes place during the initial connector extension, before any contact is made with the container. All further extension of the connector is accommodated by movement of the projections 41 and 42 along the straight portions of the slider tracks 35.

The projections 41 are prevented from entering the curved branch portions of the slider tracks 37 by the permanent engagement of the bar 43 within slot 38, and thus the valve is maintained in its fully open position as shown in FIG. 2.

Limited horizontal displacement of the sealing plate 14 in the direction of arrows A or B caused by the movement of the container in its guides during transit is accommodated by small angular movement of the disc 20 which moves in conjunction with connecting link 40 about the pivots 32 and transverse shaft 45.

Closure of the valve 19 takes place only during the final stage of retraction after the face seal 15 has disengaged from the container.

On retraction, the projections 41 and 42 move freely along the straight portions 35 of the slider tracks 34 until projections 41 abut the track termination point 36. Further movement applies a couple to the valve disc 20 causing it to rotate about its pivot 32. This rotation continues through substantially 90° until the inwardly swinging face of the valve disc 20 contacts a stop 49 situated on the inner ring 25. Continued movement causes the valve disc 20 to move axially towards the valve seat 22 against the light spring bias on the trunnion blocks 33. During this movement the valve periphery which may be either spherical or frusto-conical in shape effects a fluid tight joint in conjunction with resilient seal 30.

Good sealing engagement is maintained between the disc valve 20 and the resilient seal 30 because the compression springs 47 react against the transverse shaft 45 when the connector is in its latched position. The springs 47 provided a substantially greater force than that obtained from the spring bias applied to the trunnion blocks.

Any tendency when the valve is shut for the projections 41 to move away from point 36 is prevented by engagement between the extreme ends of the arms of connecting link 40 and the stop members 39.

Whereas reference has been made to projections 41 and 42 which co-operate with slider tracks 35 and 37 it is to be understood that rotating rollers may be employed for a similar purpose.

In the alternative construction shown in FIG. 3, parts which are substantially the same as those of the FIGS. 1 and 2 embodiment have been given the same reference numerals but those parts which have been modified are given the reference numerals of the FIGS. 1 and 2 embodiment followed by the lower case letter *a*. The modifications really only concern the valve seat and rings for the valve seat, the slider tracks and the valve operating means.

Referring to FIG. 3, the valve seat 30a for the disc 20 is sandwiched between rings 24a and 25a and is provided with a radially inwardly projecting sealing rib 50. Furthermore, the outer periphery of the valve seat 30a provides a seal with the sealing plate 14 thereby making an additional seal such as that shown at 31 in FIG. 1 unnecessary. The rings 24a and 25a are held together by a suitable thread connector 29a, the inner end of which engages a spacer 51 which itself is connected by a thread connector 52 to the inturned flange 27 on the sealing plate 14.

The valve operating means 21a functions in a substantially identical manner to that of the FIG. 1 embodiment, but the slider track 34a has been modified as has the connecting link 40a. Two slider tracks 34a are provided, one at each side of the valve disc 20 and the straight line portions 35a of the slider tracks terminate at their forward ends in an arcuate portion 53 and a further substantially parallel arcuate portion 54. Likewise, the slot 38a at its forward end is widened, the widened portion being defined by an arc 55 substantially parallel to the portion 53. The projection 41a instead of being circular, has an irregular shape which fits closely between the portions 53 and 54. The projections 41a, as in the previous embodiment, together with the projections 42 are provided on the inner face of bifurcated arms of the connecting link 40a. At their rear ends, the bifurcated arms of the connecting links 40a are connected together by a web 56 and are formed with elongated slots 44 therein to accommodate the transverse shaft 45. Pivotally connected to the shaft 45 are the bifurcated arms of a spring housing 58. Located within the housing 58 are coaxial coil springs 59 and 60, the springs applying a compression force between the rear end of the housing 58 and the web 56 on the link 40a, thereby always forcing the link 40a in a forward direction so as to maintain the projections 41a constantly in engagement with the portion 53 of the slide tracks when the valve is closed. As in the previous embodiment, this allows the coupling, when in its retracted position, to be unlatched as a result of the lost motion device provided by the slots 44 and shaft 45, and always maintains the disc 20 biased against its seat 30a.

Apart from simplifying the construction of the forward end of the link 40a and making the stop 39 unnecessary, the main purpose of the provision of the portions 53, 54 and 55 associated with the straight portion of the slide tracks and slot is to enable limited lateral movement between the sealing plate 14 (and hence the disc 20) and the link 40a when the connector is retracted, without damaging the valve operating means 21a. Such limited lateral movement can inadvertently occur due to many reasons. This movement in the direction of the arrow B is possible because the slider tracks 34a can rotate clockwise relative to the links 40a as a result of pivoting occurring about the center of the projections 42, with the result that the projections 41a will move down the portions 53 and 54 and the bar 43 will move down the portion 55. Similarly, horizontal movement in the direction of the arrow A causes movement of the slider tracks 34a, relative to the links 40a in a counterclockwise direction results in pivotal movement about the bar 43 so that the projections 42 move down the curved portions 37a. Articulation of the annular face seal 15 from the vertical plane is permitted because the bifurcated arms of the link 40a can slide relative to the shaft 45 because of the provision of the slots 44.

Of course, limited movement of the plate 14 relative to the plate 13 is accommodated without damaging the operating means for the valve because of the pivots 32 and the shaft 45, and the manner in which the link 40a is mounted on the shaft 45, and because of the manner in which the assemblies 12 are connected between the plates 13 and 14.

It will be appreciated that the valve described above could be used with any type of coupling according to the invention and which is suitable for connecting the interior of a container with a supply of fluid, and it has been designed particularly for use with those couplings disclosed in U.S. Pat. Nos. 3,463,516 and 3,473,828.

Although the valved coupling described above is formed with a body of substantially U-shaped cross section, it will be appreciated that the body or duct can be of any form which will permit extension and retraction and will offer a degree of thermal insulation. Furthermore, the above described coupling when extended so that its abutment sealing means is in engagement with a container wall around an aperture therein, accommodates limited movement of the container wall with respect to the plate 14. It will be appreciated, however, that the valve arrangement may be accommodated in any type of coupling movable between retracted and extended positions and such a coupling need not be capable of universal movement when in its extended position. Such a coupling can be moved between its two positions by any suitable form of power means although it is preferred that springs are used to move it to its extended position and motor means are used to retract it so that a seal will be maintained with the aperture in the container wall in the event of a power failure.

In a modified construction the assemblies 12 which could be hydraulic instead of pneumatic may be double acting so that they can be used to assist the springs 11 to move the coupling to its extended position as well as to withdraw it. This is especially desirable if the couplings are likely to be used in adverse weather conditions particularly in snow.

What is claimed is:

1. A valved coupling suitable for connecting an aperture leading to the interior of a refrigerated transportable container with a supply of fluid, said coupling comprising an extendable hollow body, connecting means at one end of said body for connection around a first aperture leading to a supply of fluid and abutment sealing means at the other end of said body for sealing abutting relationship with a flat sealing surface surrounding a second aperture therein with said hollow body providing a fluid passage from the first aperture to the second aperture, and valve means operating in response to extension or retraction of said coupling for permitting fluid to pass through said passage when said coupling is in its extended operative position in sealed abutting relationship with said flat sealing surface around said second aperture and for closing said passage to prevent fluid passing through said passage when the coupling is in a withdrawn inoperative position, said coupling further having means for, when extended so that said abutment sealing means is in engagement with said sealing surface, accommodating limited movement of and variations of said second aperture with respect to said fist aperture around said second aperture so that said abutment sealing means can effect a seal.

2. A coupling as claimed in claim 1, including spring means to move said coupling to its operative position and power means to move said coupling to its inoperative position, said power means acting against said spring means.

3. A coupling according to claim 1, in which said valve means includes a valve disc, and biasing means are provided to bias said valve disc to a closed position when the coupling is fully retracted.

4. A coupling according to claim 1, in which said valve means includes a disc, and the outer surface of said disc, when in a closed position, is substantially flush with the outer most surface of the abutment sealing means.

5. A coupling according to claim 1, in which the valve means includes a disc and operating mechanism therefor, all of which is housed wholly within the coupling, and in which, when the valve means is opened, the disc pivots inwardly, away from the second aperture, and remains wholly within the coupling when opened.

6. A coupling according to claim 1, in which said valve means includes a valve disc having a pivot and a valve seat engageable by said valve disc, the pivot for said valve disc being supported in a slidable trunnion block biased away from the valve disc to enable relative movement between the valve disc and the valve seat to unseat the valve disc.

7. A valved coupling suitable for connecting an aperture leading to the interior of a refrigerated transportable container with a supply of fluid, said coupling comprising an extendable hollow body, connecting means at one end of said body for connection around a first aperture leading to a supply of fluid and abutment sealing means at the other end of said body for sealing abutting relationship with a flat sealing surface surrounding a second aperture therein with said hollow body providing a fluid passage from the first aperture to the second aperture, and valve means for permitting fluid to pass through said passage when said coupling is in its extended operative position in sealed abutting relationship with said flat sealing surface around said second aperture and for closing said passage to prevent fluid passing through said passage when the coupling is in a withdrawn inoperative position, said coupling further being of the type for, when extended so that said abutment sealing means is in engagement with said sealing surface, accommodating limited movement of and variations of said second aperture with respect to said first aperture around said second aperture so that said abutment sealing means can effect a seal, a sealing plate carrying said abutment sealing means, an aperture in said sealing plate, and said valve means includes a valve seat on the internal periphery of said aperture, a disc within said coupling body, the periphery of said disc being configured to form a seal with said valve seat, and means pivotally mounting said disc for rotation about an axis fixed relative to said sealing plate.

8. A coupling as claimed in claim 7, wherein said means pivotally mounting said disc include a track and linkage arrangement to open and close said disc.

9. A coupling according to claim 8, in which when the disc is closed, interlocking means, including a stop, are provided to prevent the projections from moving along the guide track due to vibration forces.

10. A coupling as claimed in claim 8, including guide track means supplementing said track and linkage arrangement, said means pivotally mounting said disc being of the type for upon extension and retraction of said coupling causing pivotal movement of said disc and then longitudinal movement thereof.

11. A coupling as claimed in claim 10, in which said track and guide track means are fixed to the disc and said linkage is associated with a fixed part of the coupling.

12. A coupling as claimed in claim 11, including a member projecting from the rear of said disc and defining part of said guide track means, said track being a slot in said member disposed parallel to the rear face of said disc and said linkage including a pin engaging in said slot, and a connecting link, one end of said connecting link mounting said pin, the other end of said connecting link being pivotally mounted on a fixed part of the coupling.

13. A coupling as claimed in claim 12, in which said guide track means includes a guide track having a straight line portion coextensive with part of said slot, which straight line track portion merges with an arcuate track portion, and a pair of projections mounted on the link, and said guide track being engaged by said pair of projections, one of the said projections being co-axial with said pin, the arcuate track portion being effective to guide said disc during its pivotal movement between its open and closed positions.

14. A coupling as claimed in claim 12, in which two identical members project from the rear face of said disc and each forms a slider track.

15. A coupling as claimed in claim 14, in which each projecting member has a pair of slider tracks, one on each of two opposite faces.

16. A coupling as claimed in claim 12, in which said slot and guide track are offset with respect to the pivot for said disc so that extension and retraction of said coupling body will cause a couple to be applied to the disc about its pivot upon longitudinal movement of said sealing plate, as a result of the pin and projections engaging respectively with the slot and guide track to open and close the valve means.

17. A coupling as claimed in claim 12, in which said pin and slot arrangement and guide track means are shaped and related to assure that pivoting of the valve disc between open and closed positions occurs during initial coupling extension and final coupling retraction, one of the projections during said pivotal movement of said valve disc moves along the arcuate portion of the guide track, and when the valve disc is in an open position the said one projection together with the other projection, is guided along the straight line portion of the guide track during further movement of the sealing plate, thereby acting with the pin in the slot to hold the disc fully open.

18. A coupling according to claim 12, in which, at the rear end of the connecting link, a lost motion device is provided where the connecting link is pivotally mounted on a fixed part of said coupling to enable limited relative sliding movement of said connecting link on its pivot to enable the coupling to be latched and unlatched when in its retracted position.

19. A coupling according to claim 18, in which biasing means associated with said lost motion device is provided so that said connecting link is biased towards and acts against said disc when said coupling is fully retracted to keep the valve closed even during latching and unlatching.

20. A coupling according to claim 18, in which biasing means associated with said lost motion device is provided so that said connecting link is biased towards and acts against said disc when said coupling is fully retracted to keep the valve means closed even during latching and unlatching and in which the guide track and projections engaging with said guide track are suitably dimensioned to permit limited rocking movement of the sealing plate and disc relative to the connecting link, about at least one of the projections without releasing the bias on said disc.

21. A coupling comprising an apertured first plate, and apertured second plate, an extensible duct extending between said plates and defining a path for fluid flowing through said apertures in said plates, means for moving said plates away from each other into an extended position of said coupling, power means for moving said plates towards each other into a retracted position of said coupling, means locating a closure member within the duct, said closure member being dimensioned to close said aperture in said first plate and means mounting said closure member for movement from a sealing position in which it closes said aperture in said first plate when said coupling is in the retracted position to an open position opening said aperture in said first plate when said coupling moves towards the extended position.

22. A coupling as claimed in claim 21, wherein said mounting means includes means connecting said closure member between said two plates so that the movement of one plate away from the other moves the closure member away from the sealing position.

23. A coupling as claimed in claim 21, wherein said means mounting said closure member includes means mounting said closure member for pivotal movement within said duct about an axis normal to the direction of movement of the plates towards and away from each other.

24. A coupling as claimed in claim 23, in which said mounting means for the closure member is mounted to move with one of said plates, and in which a projection engages in a curved guideway to cause pivotal movement of said closure member.

25. A coupling as claimed in claim 21, in which said power means is a fluid operated extendible member interconnecting the two plates, and said means for moving said plates away from each other comprises at least one spring.

26. A coupling as claimed in claim 21, in which said closure member comprises a circular plate-like member having a pair of parallel supporting arms.

27. A coupling as claimed in claim 21, in which said mounting means are of the type wherein when the plates are in the extended position and said closure member is in an open position the closure member offers substantially no obstruction to the free flow of fluid through the coupling.

28. A coupling according to claim 21, in which said means for moving said plates away from each other into an extended position of said coupling includes spring means and wherein said power means includes a pair of double acting fluid operated piston and cylinder assemblies, said assemblies being of the type to both move said coupling to said retracted position and supplement said spring means.

29. A valved coupling suitable for connecting an aperture leading to the interior of a refrigerated transportable container with a supply of fluid, said coupling comprising an extendable hollow body, connecting means at one end of said body for connecting around a first aperture leading to a supply fluid and abutment sealing means at the other end of said body for sealing in abutting relationship with a flat sealing surface surrounding a second aperture so as to provide a fluid passage from said first aperture to said second aperture and an automatic valve mounted wholly within said coupling in said fluid passage and including means for automatically opening said valve and permitting conditioning fluid to pass through said passage when said coupling is in an extended operative position in sealed abutting relationship with the flat sealing surface around the second aperture and moving the valve to a closed position in which it closes off said passage to prevent conditioning fluid and foreign bodies from passing through the passage when the coupling is moved with a withdrawn inoperative position.

30. A coupling according to claim 29, including a pair of double acting fluid operated piston and cylinder assemblies to move said coupling between extended and retracted positions.

31. A coupling according to claim 30, including spring means to assist in moving said coupling to said extended position.

* * * * *